US009202431B2

(12) United States Patent
Sorkine-Hornung et al.

(10) Patent No.: US 9,202,431 B2
(45) Date of Patent: Dec. 1, 2015

(54) TRANSFUSIVE IMAGE MANIPULATION

(71) Applicant: DISNEY ENTERPRISES, Inc, Burbank, CA (US)

(72) Inventors: Alexander Sorkine-Hornung, Zurich (CH); Kaan Yucer, Zurich (CH); Alec Stefan Jacobson, Zurich (CH); Olga Sorkine-Hornung, Zurich (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 346 days.

(21) Appl. No.: 13/654,335

(22) Filed: Oct. 17, 2012

(65) Prior Publication Data

US 2014/0104295 A1   Apr. 17, 2014

(51) Int. Cl.
*G09G 5/00* (2006.01)
*G09G 5/02* (2006.01)

(52) U.S. Cl.
CPC ... *G09G 5/00* (2013.01); *G09G 5/02* (2013.01)

(58) Field of Classification Search
CPC .................................. G09G 5/00; G09G 5/02
USPC .......................... 345/589, 646, 642, 647, 619
See application file for complete search history.

(56) References Cited

U.S. PATENT DOCUMENTS

| | | | |
|---|---|---|---|
| 7,317,844 B1 * | 1/2008 | Horne et al. | 382/284 |
| 2007/0059669 A1 * | 3/2007 | O'Malley et al. | 434/38 |
| 2008/0180535 A1 * | 7/2008 | Habuka et al. | 348/208.4 |
| 2011/0116107 A1 * | 5/2011 | Rueby | 358/1.2 |
| 2013/0001295 A1 * | 1/2013 | Goncalves | 235/375 |

OTHER PUBLICATIONS

Baker et al, Lucas-Kanade 20 Years On: A Unifying Framework, 2004, International Journal of Computer Vision, 56(3), pp. 221-255.*
Farbman et al, Diffusion Maps for Edge-Aware Image Editing, 2010, ACM Trans. Graph., 29, 1, pp. 1-11.*
Hasinoff et al, Search-and-Replace Editing for Personal Photo Collections, 2010, Massachusetts Institute of Technology Computer Science and Artificial Intelligence Laboratory, pp. 1-8.*
Jacobson et al, Bounded Biharmonic Weights for Real-Time Deformation, Jul. 2011, ACM Trans. Graph, 20, 4, Article 78, pp. 1-8.*

(Continued)

*Primary Examiner* — Stephen R Koziol
*Assistant Examiner* — Brian Kravitz
(74) *Attorney, Agent, or Firm* — Patterson & Sheridan, LLP

(57) ABSTRACT

The disclosure provides an approach for transferring image edits from a source image to target images. In one embodiment, a warp application receives a user-selected region of interest in a source image and determines for the region of interest content-aware bounded weight functions and seed locations for the same. For each of the target images, the warping application initializes a linear blend skinning subspace warp to a projection onto a feature space of a piecewise affine map from scale invariant feature transform features of the source image to the target image. After initializing the warps, the warping application iteratively optimizes the warps by applying the inverse compositional Lucas-Kanade procedure and using the content-aware weight functions in said procedure. Edits made to the source image may automatically be transferred to target images by warping those edits via the optimized warp function for the respective target images.

18 Claims, 4 Drawing Sheets

(56) References Cited

OTHER PUBLICATIONS

Levin et al, Colorization using Optimization, 2004, ACM Trans. Graph, 23, 3, pp. 1-6.*
Lichinski et al, Interactive Local Adjustment of Tonal Values, 2006, ACM Trans. Graph, 25, 3, pp. 1-8.*
Reinhard, et al, Color Transfer between Images, Sep./Oct. 2001, IEEE Computer Graphics and Applications, pp. 34-41.*
Mikolajczyk et al, Scale & Affine Interest Point Detectors, Jan. 22, 2004, International Journal of Computer Vision, 60(1), pp. 63-86.*
Agarwala et al, Keyframe-Based Tracking for Rotoscoping and Animation, 2004, ACM SIGGRAPH, 23, 3, pp. 1-8.*
Solem, Piecewise affine warping using SciPy, Jun. 27, 2009, solem's vision blog (http://www.janeriksolem.net/2009/06/piecewise-affine-warping-using-scipy.html), pp. 1-5.*
Sand et al, Video Matching, 2004, ACM Trans. Graph, 23, 3, pp. 1-8.*
Lucas et al, An Iterative Interactive Registration Technique with an Application to Stereo Vision, Aug. 24-28, 1981, Proc $7^{th}$ Intl Joint Conf on Atrificial Intelligence (IJCAI) pp. 674-679.*
Lowe, D.G., "Distinctive Image Features from Scale-Invariant Keypoints," International Journal of Computer Vision, 60(2), pp. 91-110, Jan. 7, 2004.

* cited by examiner

TRANSFUSIVE IMAGE MANIPULATION

BACKGROUND

1. Field

Embodiments presented herein provide techniques for image manipulation. More specifically, embodiments presented herein disclose techniques for transferring edits made to one image to other images of the same object or scene.

2. Description of the Related Art

Transferring pixel-level edits from one image to another requires accurate mappings between corresponding image regions. General purpose correspondence estimation techniques include dense optical flow. However, such techniques are akin to cloning and can only handle small image displacements and appearance changes. That is, such approaches do not permit edits made to a source image to be correctly transferred to target images which differ from the source image as a result of large perspective changes, illumination changes, or non-rigid deformations. Further, such approaches do not account for relatively large occlusions in the target image(s). Edits cannot be correctly transferred from the source image if the target image(s) have such occlusions.

SUMMARY

One embodiment of the invention includes a computer implemented method for transferring image edits from a source image to a target image. The method includes determining, via one or more processors, content-aware weights for the source image. The method further includes determining, via one or more processors, an initial warp from the source image to the target image, and iteratively optimizing the initial warp using the content-aware weights. In addition, the method includes applying the optimized warp to transfer the image edits to the target image.

Other embodiments include a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of aspects of the invention, briefly summarized above, may be had by reference to the appended drawings.

It is to be noted, however, that the appended drawings illustrate only typical aspects of this invention and are therefore not to be considered limiting of its scope, for the invention may admit to other equally effective aspects.

DETAILED DESCRIPTION

Figure 1:
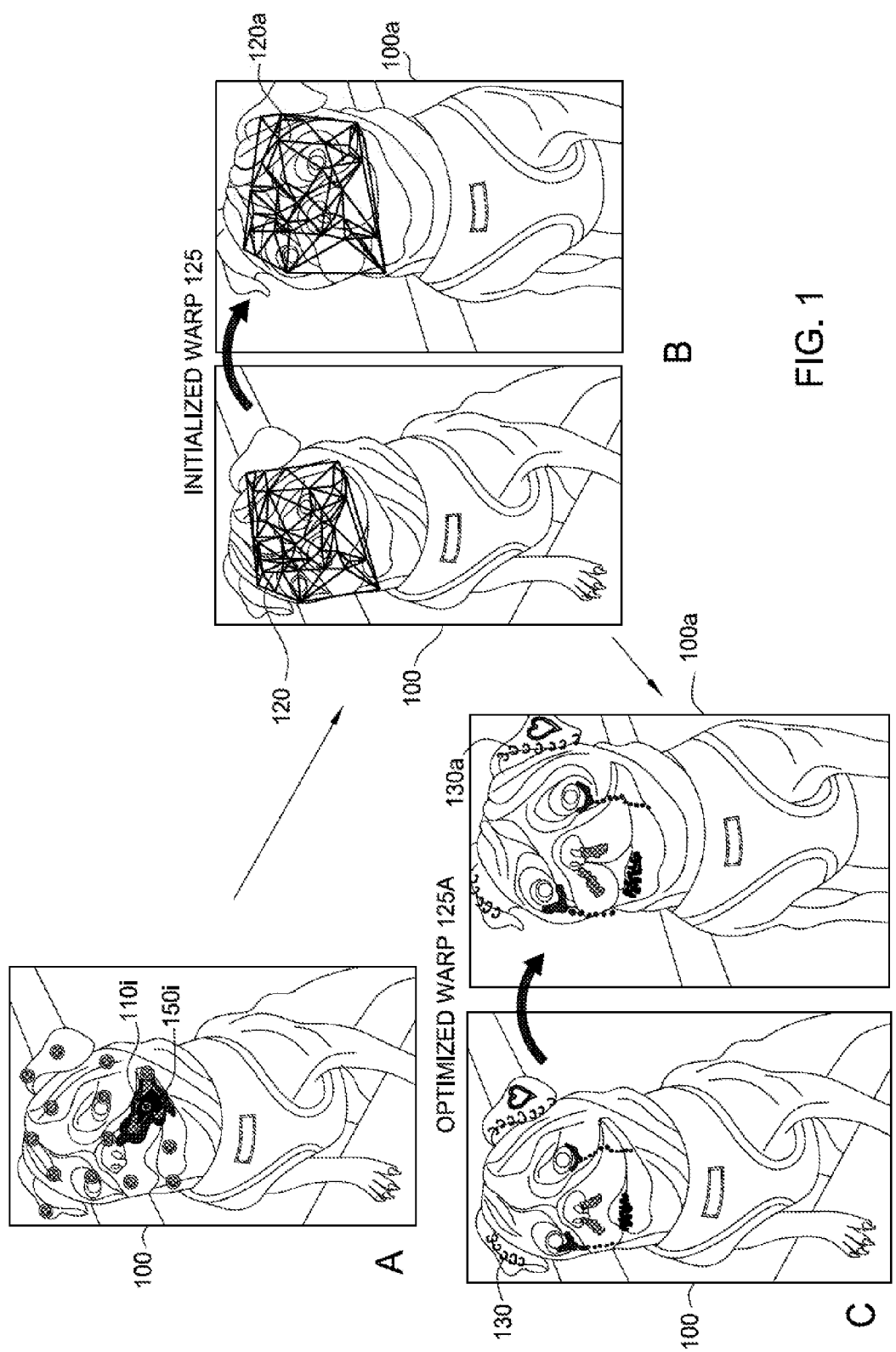
FIG. 1 illustrates an approach for transferring image edits, according to an embodiment of the invention.

Embodiments disclosed herein provide techniques for transferring image edits from a source image to target images. The techniques include receiving, by a warping application, a user-selected region of interest in a source image and determining for the region of interest content-aware weight functions, such as content-aware bounded biharmonic weights (BBWs), and seed locations for the same. Here, content-aware BBWs may be obtained via BBW optimization in a feature space such as the International Commission on Illumination (CIE) L*a*b* color space (also referred to herein as "L*a*b* color space"). Such optimization produces weights sensitive to image content and propagating to similar image areas while dropping off at salient edges, among other properties. For each target image, the warping application initializes a warp (also referred to herein as "warp function") which takes respective source image pixel coordinates and maps them to pixels coordinates of the target image. In one embodiment, each warp function may be a warp in linear blend skinning subspace of deformations, and each warp may be initialized to a projection onto a feature space of a piecewise affine map between scale invariant feature transform features of the source image and the respective target image. After initializing the warps, the warping application iteratively optimizes the warps by applying an inverse compositional Lucas-Kanade procedure and using content-aware BBWs in said procedure. Thereafter, edits made to the source image may automatically be transferred to target images by warping those edits via the optimized warp functions for the respective target images.

The following description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

FIG. 1 illustrates an approach for transferring image edits, according to an embodiment of the invention. As shown in panel A, content-aware bounded biharmonic weights (BBWs) (e.g., content-aware bounded BBW 110$i$) are determined for a source image 100. Each content-aware BBW controls a region of the image 100 (e.g., content-aware BBW 110$i$ controls region 150$i$) in the sense that pixels in the region are translated, rotated, squeezed, sheered, and the like based on how much those pixels are influenced by the controlling BBW. Further, each content-aware BBW is "content aware" in that the weights are sensitive to content of the image and propagate to similar image areas, while dropping off at salient edges which may correspond to boundaries of objects, boundaries of surface markings, discontinuities in surface orientation, and the like. The content-aware BBWs may be used while iteratively optimizing a warp 125 from the source image 100 to the target image 100$a$. The optimized warp 125$a$ may then be applied to transfer edits from the source image 100 to the target image 100$a$.

As discussed in greater detail below, the content-aware BBWs may be determined by optimizing BBWs in a feature space, such as the International Commission on Illumination (CIE) L*a*b* color space. Seed locations for the content-aware BBWs may be determined by, e.g., applying an operator to the source image to determine the magnitudes of the intensity gradient (dI/dx, dI/dy) (i.e., the gradient magnitude values) in the source image, creating a confidence image itself created by applying heat diffusion to gradient magnitude values, and then iteratively selecting a number of highest confidence locations while updating the confidence image after each selection by subtracting a Gaussian kernel.

As shown in panel B, a warp from the source image 100 to the target image 100$a$ is computed by iterative optimization, starting from an initialized warp 125 which is a projection of a map between scale-invariant transform (SIFT) features 120, 120$a$ of the source and target images 100, 100$a$, respectively, to a space of maps spanned by the degrees of freedom of the feature space. The warp 125 is a function which receives pixel coordinates in the source image 100 as input and outputs corresponding coordinates for the target image 100$a$. That is, the warp 125 provides an image registration between region(s) of the source and target images. For example, the warp 125 may be used to deform the source image 100 into an image which is a close match to the target image 100$a$. Given an edit made to the source image 100, the edit may be plugged into the warp function 125 to determine a corresponding edit for the target image 100$a$. In one embodiment, the initialized warp function 125 may be iteratively optimized according to an "inverse compositional" Lucas-Kanade procedure, thereby producing an optimized warp 125$a$ from the source image 100 to the target image 100$a$. The inverse compositional Lucas-Kanade procedure is a gradient-based iterative optimization technique which may be used to optimize parameters so as to reduce a mismatch between two images. Of course other iterative optimization procedures may be used. Further, the content-aware BBWs may be used in the Lucas-Kanade (or other iterative optimization) procedure, as discussed in greater detail below.

As shown in panel C, image edits 130 made to the source image 100 are transferred to the target image 100$a$ via the optimized warp 125$a$. In general, the image edits 130 may include any user made or automatically generated alterations to the source image 100. Illustratively, various circles, hearts, and other edits have been drawn onto the dog depicted in the source image 100. The edits 130, when transferred to the target image 100$a$, appear as edits 130$a$. To obtain the edits 130$a$, coordinates in the source image 100 associated with the edits 130 may simply be plugged into the optimized warp function 125$a$, which then outputs coordinates (e.g., floating point coordinates corresponding to sub-pixel locations) for those edits in the target image 100$a$. The edits 130$a$ may then be made at the appropriate locations in the target image 100$a$. For example, as image edits are made to the source image 100, the edits may be automatically transferred to the target image 100$a$ using the optimized warp function 125$a$. Of course, such image edits may also be transferred to the target image 100$a$ at a later time.

Figure 2:
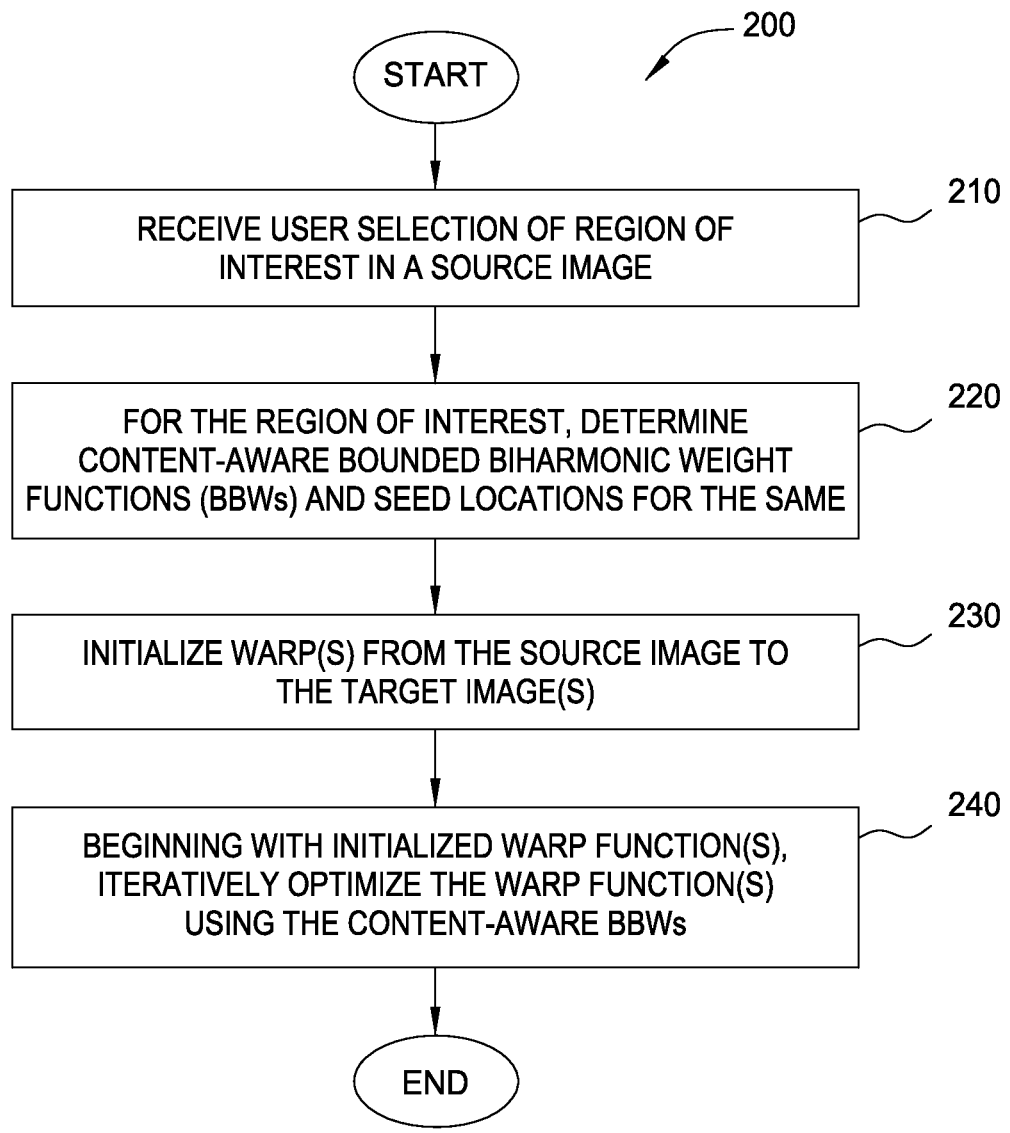
FIG. 2 illustrates a method for determining a warp function for transferring edits from a source image to target images, according to an embodiment of the invention.

FIG. 2 illustrates a method 200 for determining a warp function for transferring edits from a source image $I_s$ to target images $I_t$, t=1, ..., N, according to an embodiment. As shown, the method 200 begins at step 210, where a warping application receives a user selected region of interest in the source image. The goal being to transfer edits from the source image $I_s$ to target images $I_t$, t=1, ..., N, a warping application may determine an optimal map $\mathcal{M}_t$ which takes pixel coordinates p∈$I_s$ to new pixel coordinates p'∈$I_t$ (or, in some embodiments, sub-pixel coordinates). In general, maps may be considered over the entire source domain, but, because edits may only be made to a subregion of the source image $R_s \subseteq I_s$, the user may select such a region as the region of interest so that the warping application only considers warps over the region. Doing so may permit faster and better convergence during iterative optimization, discussed below, because the warping application may ignore extraneous regions of the source image on which edits are not made. In one embodiment, the region of interest may be fuzzy, defined by the mask function r(p)∈[0,1] which reaches 1 at pixels fully inside the region and fades to 0 at the boundary of $R_s$.

At step 220, the warping application determines, for the user-selected region of interest, content-aware bounded biharmonic weight functions (BBWs) and seed locations for the same. Determining the optimal map $\mathcal{M}_t$ by optimizing over all possible maps is typically intractable. Instead, a subspace of warp functions spanned by the linear combination of a number of affine transformations may be used, such as the linear blend skinning (LBS) subspace of deformations:

$$\mathcal{M}_t(p) = \Sigma_{k=1}^m w_k(p) T_k p \quad (1)$$

Here, $w_k$ are spatially-varying scalar weight functions, and $T_k$ are affine transformations which may be optimized. When carefully designing the minimization process and the weight functions $w_k$, the LBS subspace can be sufficiently expressive, producing accurate and intuitive warps which also balance between smoothness and content-adaptiveness. In particular, the weight functions $w_k$ may be defined to provide parametrizable smoothness and content-adaptivity by interpreting images as manifolds, as discussed below. Experience has shown that working in the LBS subspace is advantageous because the subspace provides a controllable balance between computationally expense and expressiveness and accuracy of the mapping. Despite optimizing only the parameters of a few affine transformations, the content-adaptive weighted interpolation allows for mapping functions that faithfully follow the shape of even complex objects. In addition, the reduced subspace acts as a regularization which avoids the pitfalls and local minima issues found in optical flow techniques. This allows matching of significant changes in viewpoint, illumination, non-rigid deformation, and occlusions so that edits may be accurately transferred from the source image to the target images.

Classically, BBWs have been used as weight functions for realtime deformation of 2D and 3D shapes. Typically, each classical BBW $w_k$ is associated with a handle $H_k$ which is a region (or a single point) in the domain fully controlled by that weight function. As a result, $w_k$ has value 1 on $H_k$ and 0 on all other handles. The weight function $w_k$ may be defined by optimizing Laplacian energy subject to constant bound constraints:

$$\arg\min_{w_k, k=1,\ldots,m} \Sigma_{k=1}^{m} \tfrac{1}{2} \int_{I_s} (\Delta w_k)^2 dx\, dy \qquad (2)$$

$$\text{subject to: } w_k | H_l = \delta_{kl}, k, l = 1, \ldots, m \qquad (3)$$

$$\Sigma_{k=1}^{m} w_k(p) = 1 \,\forall p \in I_s \qquad (4)$$

$$0 \leq w_k(p) \leq 1, k=1,\ldots,m, \forall p \in I_s. \qquad (5)$$

Assuming the 2D region of interest domain $R_s$ is discretized with a triangle mesh $\Omega$ with n vertices, the discrete optimization problem for weight functions $w_k \in \mathbb{R}^n$ may be written as follows:

$$\arg\min_{w_k} \Sigma_{k=1}^{m} w_k^T Q w_k, \qquad (6)$$

subject to the constraints (3)-(5). The coefficients matrix of the energy is the discrete biharmonic operator $Q = LM^{-1}L$, where the matrices L and M are the stiffness and diagonal mass matrices, respectively, of the discretization mesh $\Omega$:

$$L_{ij} = \begin{cases} -\tfrac{1}{2}(\cot\alpha_{ij} + \cot\alpha_{ji}) & \text{if } j \in N(i) \\ -\sum_{l \in N(i)} L_{il} & \text{if } j = 1 \\ 0 & \text{otherwise} \end{cases} \qquad (7)$$

$$M_{ii} = \text{Voronoi area around vertex } i, \qquad (8)$$

where $N(i)$ is the set of mesh neighbors of vertex i, and $\alpha_{ij}$ is the angle opposite the directed edge from i to j on the incident triangle lying to the left of the edge (if it exists).

The weights $w_k$ resulting from the foregoing optimization enjoy smoothness guarantees of a fourth-order energy minimizer, as well as locality, boundedness, and interpolation. However, such BBW weights are not content aware, because their definitions depend solely on the handle locations $H_k$ and the Riemannian metric of the domain $R_s$ imposed by the biharmonic operator.

The classical weight functions discussed above may be modified so as to adapt them to image content. In particular, the geometry of the discretization mesh $\Omega$ may be mapped into a higher-dimensional feature space $\mathbb{R}^D$, such that the mesh becomes a 2-manifold in that space. For each vertex $v \in \Omega$, some of the attributes of the vertex may be concatenated to the 2D spatial coordinates of the vertex as additional dimensions. For example, the following 5-dimensional embedding may be obtained by expressing image colors at the vertices in CIE 1976 (L*, a*, b*) color space:

$$v(x,y) \to (x,y,s_l l(x,y),s_a a(x,y),s_b b(x,y)), \qquad (9)$$

where the scaling factors s* account for color value coordinates not being readily proportional to Euclidean pixels and further allow for varying the sensitivity of the weights to image content. In one embodiment, s* may be taken to be 16.

The following properties may be obtained by optimizing BBW weights over the 2-manifold in feature space: (i) sensitivity to image content and propagation to similar image areas, dropping off at salient edges; (2) localized (i.e., have limited spatial interaction range); (3) smooth (at least $C^1$) everywhere such that warping is smooth in smooth mesh regions; and (4) limited to the [0,1] range. For example, in the case of the L*a*b* color space discussed above, strong image edges will become steep creases in a 5D 2-manifold, making the travel distance on the manifold across the edge long, such that the weight function will have an abrupt derivative across the edge. Further, experience has shown that L*a*b* color space works better than some other feature spaces (e.g., grayscale and RGB feature spaces) in obtaining the foregoing properties.

To define the BBW optimization problem in feature space, the discretization of the bi-Laplacian operator $Q = LM^{-1}L$ may be adjusted to the Riemannian metric of the image domain embedded in the $\mathbb{R}^D$ feature space. In particular, the stiffness and diagonal mass matrices L and M may be adapted to have the same formulas of cotangents and area, but of mesh triangles embedded in $\mathbb{R}^D$.

In one embodiment, the lengths $l_{ij}, l_{jk}, l_{ki}$ of the three sides of a triangle $T_{ijk}$ may be used to extract the necessary quantities, as lengths are easy to compute in any dimension. The triangle area $A_{ijk}$ is given by Heron's formula:

$$A_{ijk} = \sqrt{r(r-l_{ij})(r-l_{jk})(r-l_{ki})}, \qquad (10)$$

where r is the semi-perimeter $\tfrac{1}{2}(l_{ij}+l_{jk}+l_{ki})$. Cotangents of the given angles may be determined via trigonometric identities as:

$$\cot(\alpha_{ij}) = \frac{l_{jk}^2 + l_{ki}^2 - l_{ij}^2}{4A_{ijk}}, \qquad (11)$$

$$\cot(\alpha_{jk}) = \frac{l_{ki}^2 + l_{ij}^2 - l_{jk}^2}{4A_{ijk}},$$

$$\cot(\alpha_{ij}) = \frac{l_{ij}^2 + l_{jk}^2 - l_{ki}^2}{4A_{ijk}}$$

Such cotangents may be used to construct and solve the BBW optimization problem for the weights $w_k$ over the surface in $\mathbb{R}^D$. In particular, such optimization amounts to sparse quadratic programming (QP) with constant inequality constraints. As a result, the weights $w_k$ may be determined using, for example, MOSEK solver.

In one embodiment, each weight function $w_k$ may be solved for separately, dropping the partition of unity constraint of equation (4) and then normalizing the weights to sum to 1. In a further embodiment, the source image may be downsampled before solving for weight functions $w_k$, and the weight functions $w_k$ may later be upsampled to full resolution using interpolation, such as bicubic interpolation. Doing so avoids using the full-resolution source image, because solving for weight functions $w_k$ with the fine resolution of source images may be computationally expensive. Advantageously, content-aware weight functions, as described herein, are resilient to changes in discretization resolution. While downsampling too much may have a smoothing effect and change the support regions of each weight function, the values and supports of the weight functions tend to change little as discretion approaches full resolution.

In the classical formulation of BBWs, the weight functions are meant to be attached to user-specified handles $H_k$, which are placed by the user onto regions that she intends to control. In contrast, content-aware BBWs may be automatically placed at seeds locations where the weights are respectively constrained to 1 and 0. In particular, because content-aware BBWs tend to fall off at salient edges, one embodiment may choose seed locations in a manner that approximates uniform distribution over the region of interest $R_s$ and place the BBWs away from strong edges. In such a case, the warping application may determine a gradient magnitude of the source image and apply head diffusion on the gradient magnitude values to create a confidence image. Then, the warping application may iteratively select the m highest confident locations, updating the confidence map after each selection by subtracting a Gaussian kernel with standard deviation $\sqrt{|R_s|/(\pi m)}$. Advantageously, generating seed locations using this approach is simple and computationally efficient. However, various other distribution methods may also be used to generate seed locations.

At step 230, the warping application initializes warp(s) from the source image to the target image(s). Doing so provides a starting point for iterative optimization of the warp function(s), discussed in greater detail below. In one embodiment, iterative optimization may begin with an initial warp $\mathcal{M}^0$ parametrized by initial affine transformations $T_k^0$. Here, trivial initial guesses (e.g., using the identity transformation for both $\mathcal{M}^0$ and $T_k^0$) may result in slow convergence due to the nonlinear nature of the energy. To alleviate such slow convergence, the warping application may use a sparse set of scale-invariant feature transform (SIFT) features as the initial guess.

SIFT features in the source and target images may be determined using a variety of methods, such as that discussed in Lowe, D. G. 2004, Distinctive image features from scale-invariant keypoints, *Int. J. Comput. Vision* 60, 2, 91-110, hereby incorporated by reference in its entirety. Further, correspondences between the SIFT features in the source and target images may be determined via, e.g., Random Sample Consensus (RANSAC). In the ideal case, there may be many correct matches all over the region of interest $R_s$. The Delaunay triangulation $\tau$ of the source feature locations and the mappings of this triangulation to the matched target feature locations to define a piecewise-affine map $\mathcal{M}_{SIFT}$ for each of the target image(s). In extreme cases where there are too few matches, one may manually add corresponding points to the source and target images. Note, neither the SIFT features nor the optional manual correspondences are hard constraints (they are used only for initialization purposes), so they need not be particularly accurate.

For each of the target image(s), the piecewise affine map $\mathcal{M}_{SIFT}$ may be projected to the space of maps spanned by the appropriate degrees of freedom. That is, the warping application may determine the initial affine transformations $T_k^0$ that best reproduce $\mathcal{M}_{SIFT}$ in a least-squares sense $$\arg\min_{T_k^0, k=1,\ldots,m} \Sigma_{p \in \tau} r(p) \| \mathcal{M}_{SIFT}(p) - \Sigma_{i=1}^m w_k(p) T_k^0 p \|^2, \quad (12)$$

which amounts to solving a dense linear system with 6m variables.

If SIFT features are only found in one part of the source image, the above system may be undetermined, as there may exist transformations $T_k$ whose corresponding weight functions $w_k$ are zero or near zero for all pixels in $\tau$. In such cases, the warping application may regularize the weight functions $w_k$ against the best-fit global affine transformation A found using RANSAC on the SIFT features, adding the following term to the minimization of equation (12):

$$\gamma \Sigma_{p \in I_s} r(p) \| Ap - \Sigma_{i=1}^m w_k(p) T_k^0 p \|^2, \quad (13)$$

where $\gamma$ balances between fitting to $\mathcal{M}_{SIFT}$ inside T and matching A elsewhere.

Although described above as a fully automated process, alternative embodiments may allow a user to assist in the initialization process. For example, the user may provide a set of points for each target image which corresponds to a set of points of the source image. Such user assistance may help the iterative optimization, discussed below, to converge in some cases.

At step 240, the warping application iteratively optimizes the warp(s) from the source image to the target image(s), beginning with the initialized warp determined at step 230, using the content-aware BBWs determined at step 220. In one embodiment, the warping application may perform iterative optimization using the Lucas-Kanade (LK) procedure. In particular, the LK procedure and its extensions may be used to align corresponding image regions, thereby permitting a consistent transfer of edits between images. The basic LK procedure computes parameters of a warp function $\mathcal{M}$ by an iterative minimization of the color mismatch between source image pixels $I_s(p)$ and corresponding warped pixels in some target image $I_t\mathcal{M}(p)$:

$$\arg\min \mathcal{M} \Sigma_{p \in I_s} r(p) \phi(I_t(\mathcal{M}(p)), I_s(p)). \quad (14)$$

Here, $\phi$ is an error norm which measures the difference in color values between a source pixel p and the corresponding pixel $\mathcal{M}_t(p)$. For $\phi$, a robust error norm may be used for increased robustness to image consistencies (e.g., occlusions). For example, one embodiment may use adaptive thresholding with spatial coherence approximation. In addition, linear appearance changes may be accounted for within the same framework to compensate for changes in illumination during the matching, as discussed in greater detail below.

In one embodiment, the search space of the optimization may be reduced by considering only the subspace of warps $\mathcal{M}$ defined by weighted linear combinations of a small number of affine transformations. If the per-pixel weight functions $w_k$ are precomputed, then the only parameters of such a subspace are the elements of the affine transformation matrices $T_k \in \mathbb{R}^{2 \times 3}$. That is, given m pairs of weight functions and transformations, the subspace is parametrized by only 6m degrees of freedom. In such a case, the optimization becomes:

$$\arg\min_{T_k, k=1,\ldots,m} \Sigma_{p \in I_s} r(p) \phi(I_t(\Sigma_{i=1}^m w_k(p) T_k p), I_s(p)). \quad (15)$$

Warp functions $\mathcal{M}$ according to equation (15) may readily be integrated into the standard "forward additive" variant of the LK procedure. Experience has shown, however, that such a variant of the LK procedure may be computationally inefficient, as it requires a re-computation of the Hessian matrix at each iteration of the algorithm. In one embodiment, a modification of the more computationally-efficient "inverse compositional" variant of LK to search over the parameterized space.

In the "inverse compositional" LK, an incremental warp update is utilized in which the roles of $I_s$ and $I_t$ are exchanged compared to in equation (15). This enables more efficient implementations, as the Hessian and other expensive steps can be precomputed. However, a global warp must be iteratively composed with the following update rule:

$$\mathcal{M}(p) \leftarrow \mathcal{M}(p) \circ \Delta \mathcal{M}(p)^{-1}, \tag{16}$$

where $\Delta \mathcal{M}$ is a warp update computed in every iteration. Inserting equation (1) into equation (16) gives:

$$\mathcal{M}(p) \leftarrow [\Sigma_{k=1}^m w_k(p) T_k p] [\Sigma_{l=1}^m w_l(p) \Delta T_l p]^{-1}, \tag{17}$$

where $\Delta T_k$ are updates to the affine transformation matrices $T_k$. Equation (17) may be rewritten using the distributive property as:

$$= \Sigma_{k=1}^m [w_k(p) T_k [\Sigma_{l=1}^m w_l(p) T_l]^{-1}] p. \tag{18}$$

Given BBWs which are sufficiently content-aware, localized, and smooth (e.g., content-aware BBWs), $\Delta T_l$ may be replaced by $\Delta T_k$ in the inner sum of equation (18), resulting in:

$$\approx \Sigma_{k=1}^m [w_k(p) T_k [\Sigma_{l=1}^m w_l(p) \Delta T_k]^{-1}] p. \tag{19}$$

The reasoning behind such an approximation will be apparent from a consideration of the influence of a transformation and weight function pair ($T_k$ and $w_k$) on some pixel p. Here, it is instructive to distinguish between three cases.

In the first case, pixel p is dominated by the weight function $w_k$, i.e., $\forall l \neq k$: $w_l(p) \approx 0$. In such a case, the influences of all other transformations $\Delta T_l$ with $l \neq k$ on p are negligible and only the contribution for $l=k$ remains in the inner sum.

In the second case, pixel p has a low weight $w_k(p) \approx 0$. Consequently, neither the associated transformation $T_k$ nor the inner sum have a significant influence on p and may be neglected.

In the third case, pixel p is influenced by multiple constraints, i.e., $w_k(p) > 0$ for some set K of k's. Given content-aware weights, the weights should fall off quickly near edges. As a result, pixel p may be influenced by multiple constraints only when it is located within a smoothly varying image region in $I_s$. Further, it is reasonable to assume that the corresponding region in $I_t$ is also smoothly varying. By replacing $\Delta T_l$ with $\Delta T_k$, $k \in K$ in the inner sum of equation (18), the assumption is made that, in such smoothly varying image regions, constraints with overlapping weight functions undergo similar transformations between images.

Assuming that the weight functions partition unity at every pixel, equation (19) can further be simplified to:

$$\mathcal{M}(p) \leftarrow \Sigma_{k=1}^m [w_k(p) T_k [\Delta T_k]^{-1}] p. \tag{20}$$

Here, the inner sum of weighted affine transformations has been reduced to a single, easily-inverted transform. Experience has shown that, despite the approximation made in equation (20), the solution of equation (20) robustly and efficiently converges to a pixel-accurate matching even in challenging cases.

In one embodiment, in addition to the robust error norm $\phi$ discussed above, two additional degrees of freedom may be used to account for global bias and gain. In general, different pixels will undergo different appearance changes, so ideally bias and gain parameters would be per-pixel. However, such an approach may be computationally expensive. Experience has shown that content-aware BBW weights may be used instead to blend appearance parameters. In particular, smooth lighting variations, as well as discontinuities in illumination, can be handled using such weights. In practice, this can be achieved by replacing $I_s(p)$ in equation (15) with $$I_s(p) + \Sigma_{k=1}^m w_k(p)(a_k I_s(p) + b_k), \tag{21}$$

where $a_k$ and $b_k$ represent the bias and gain corresponding to weight $w_k$, and determining new bias and gain degrees of freedom during the iterative optimization discussed above.

Figure 3:
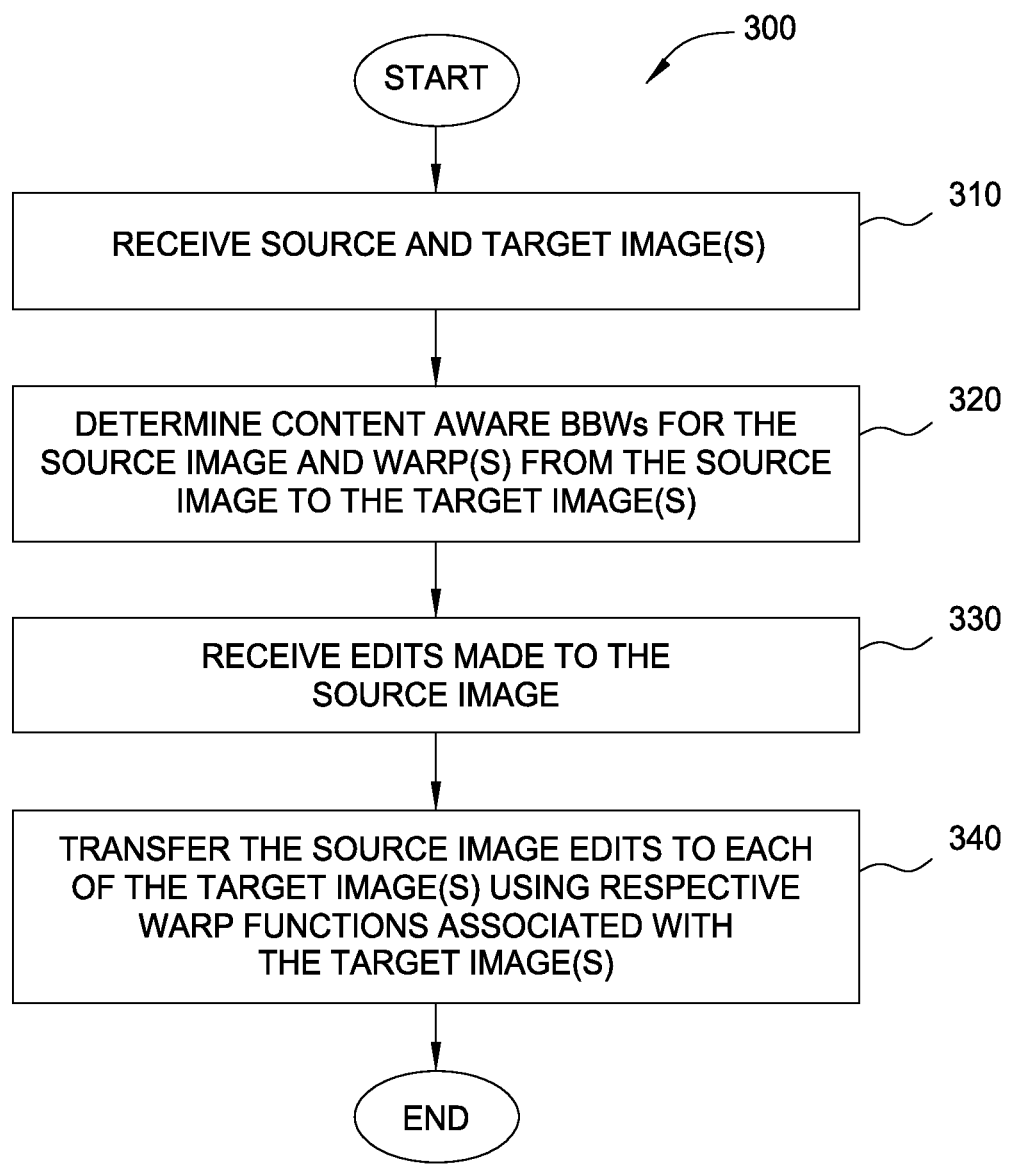
FIG. 3 illustrates a method for transferring image edits made to a source image to target images, according to an embodiment of the invention.

FIG. 3 illustrates a method 300 for transferring image edits made to a source image to target images, according to an embodiment. As shown, the method 300 begins at step 310, where a warping application receives source and target image(s). At step 320, the warping application determines content-aware BBWs for the source image and warp(s) from the source image to each of the target image(s). In one embodiment, the warping application may determine content-aware BBWs by optimizing a BBW in feature space such as the L*a*b* color space, as discussed above. Further, based on the determined content-aware BBWs, the warping application may determine warp(s) from each of the target image(s) to the source image by iterative optimization using the inverse compositional LK procedure, similar to the discussion above with respect to FIG. 2.

At step 330, the warping application receives edits made to the source image. Here, edits may include changes to any part(s) of the source image (e.g., changes in color, brightness, hue, contrast, etc. to part(s) of the source image). Such edits may be made via a separate image editing application, such as Adobe's Photoshop®, or the warping application itself may include a component which allows users to edit images.

At step 340, the warping application transfers the source image edits to each of the target image(s) by applying the respective warp function(s) associated with those images. That is, the warping application determines, using the respective warp function(s), pixel (or sub-pixel) location(s) in the target image(s) which correspond to the pixel location(s) of the source image edits, and applies appropriate edits corresponding to those made to the source image at the determined pixel (or sub-pixel) location(s) of the target image(s). In one embodiment, edit transfers may be made in real time as image edits are made by a user. Of course, the edit transfers may also be made at a later time.

Figure 4:
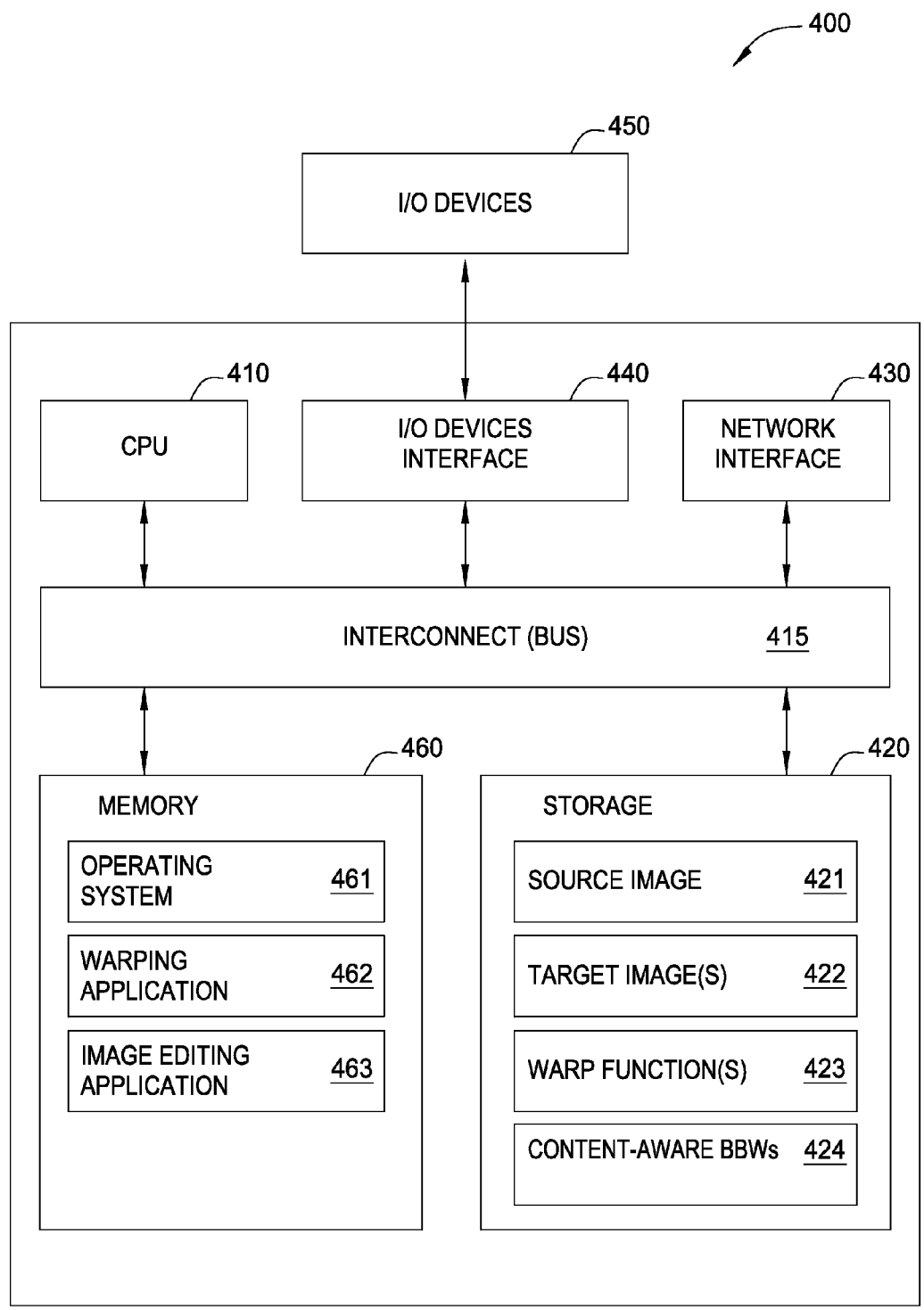
FIG. 4 depicts a block diagram of a system in which an embodiment may be implemented.

FIG. 4 illustrates a system 400 in which aspects of the invention may be implemented. As shown, the system 400 includes, without limitation, a central processing unit (CPU) 410, a network interface 430, an interconnect 415, a memory 460 and storage 420. The system 400 may also include an I/O device interface 440 connecting I/O devices 450 (e.g., keyboard, display and mouse devices) to the system 400.

The CPU 410 retrieves and executes programming instructions stored in the memory 460. Similarly, the CPU 410 stores and retrieves application data residing in the memory 460. The interconnect 415 facilitates transmission, such as of programming instructions and application data, between the CPU 410, I/O device interface 440, storage 420, network interface 430, and memory 460. CPU 410 is included to be representative of a single CPU, multiple CPUs, a single CPU having multiple processing cores, and the like. And the memory 460 is generally included to be representative of a random access memory. The storage 420 may be a disk drive storage device. Although shown as a single unit, the storage 420 may be a combination of fixed and/or removable storage devices, such as tape drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of the system 400 shown in FIG. 4 may be distributed across multiple computing systems connected by a data communications network.

As shown, the memory 460 includes an operating system 461 and applications 462-463. Illustratively, the operating system may include Microsoft Windows®. The applications 462-463 include a warping application 462 and an image editing application 463. The warping application 462 may be configured to determine content-aware BBWs given a source image 421 and warp(s) 423 from the source image 421 to the target image(s) 422. In addition, the warping application may transfer received edits which are made to the source image 421 to the target image(s) 423 using the respective warp(s) associated with those target image(s) 423. In one embodiment, the warping application may determine content-aware BBWs 424 and warp functions(s) 423, and transfer edits to the source image 421, according to the methods 200 and 300 discussed above. Illustratively, the source image 421 and target image 422, as well as edits thereto, may be stored in the storage 420. Similarly, the warp function(s) 423 and content-aware BBWs 424 determined by the warping application 462 may be stored in the storage 420.

The image editing application 463 may generally be any application which permits a user to edit a source image. Illustratively, the image editing application 463 may include Adobe's Photoshop®. Although shown as separate from the warping application 462, the image editing application 463 may also be part of the warping application 462, or vice versa. For example, the image editing application 463 may be a component within the warping application 462 which provides an interface for users to edit the source image. Upon receiving such edits, the warping application 462 may use the appropriate warp(s) to transfer the edits to target image(s).

Although discussed above with respect to transferring image edits, content-aware BBWs possessing high-order edge-aware smoothness and additional properties, discussed above, are suitable for many other applications, such as matting, colorization, localized tonal adjustment, and image deformation.

Although discussed above primarily with respect to content-aware BBWs, other content-aware weight functions, or non-content-aware weight functions, may be used in lieu of content-aware BBWs. For example, bounded biharmonic, biharmonic, harmonic, and global weight functions may be used. Nevertheless, content-aware BBWs have properties, such as location interaction, smoothness, boundedness, and content awareness, which some other weight functions may lack. Experience has shown that, given these properties, use of content-aware BBWs may be particularly advantageous.

Although discussed above primarily with respect to warps from source to target images, the target images may be mapped back to the source image using "backwards warping." That is, warps may generally be used in both directions (i.e., to warp source image coordinates to target image coordinates, and vice versa). For example, backwards warping may include bilinearly interpolating the color values in the target coordinates and writing them back to the corresponding input source coordinates.

Advantageously, techniques disclosed herein permit edits made to a source image to be correctly transferred to target image(s) despite relatively large perspective changes, illumination changes, and non-rigid deformations between the source image and the target image(s). Further, techniques discussed herein account for relatively large occlusions in the target image(s) such that edits may be correctly transferred despite the occurrence of such occlusions. In addition, techniques discussed herein guarantee mathematical smoothness of weight functions, thereby producing continuous warps in cases where previous techniques would generate discontinuous warps.

While the foregoing is directed to aspects of the present invention, other and further aspects of the invention may be devised without departing from the basic scope thereof, and the scope thereof is determined by the claims that follow.

What is claimed is:

1. A computer-implemented method for transferring image edits from a source image to a target image, comprising:
   determining, via one or more processors, content-aware weights for the source image, wherein the content-aware weights are content-aware bounded biharmonic weights (BBWs);
   determining, via the one or more processors, an initial warp from the source image to the target image;
   iteratively optimizing the initial warp using the content-aware weights; and
   applying the optimized warp to transfer the image edits to the target image.

2. The method of claim 1, further comprising, receiving a selection of a region of interest in the source image.

3. The method of claim 1, further comprising,
   determining gradient magnitude values for the source image;
   determining a confidence image by applying heat diffusion to the gradient magnitude values; and
   iteratively selecting a plurality of highest confidence locations, wherein the iteratively selecting includes subtracting a Gaussian kernel from the confidence image after each selection of a highest confidence location, and wherein the selected plurality of highest confidence locations provide seed locations for the content-aware weights.

4. The method of claim 1, wherein determining the content-aware weights includes optimizing BBWs in a feature space.

5. The method of claim 4, wherein initializing the warp from the source image to the target image includes determining a piecewise affine map between scale-invariant transform (SIFT) features of the target image and SIFT features of the source image, and projecting the piecewise affine map to a space of maps spanned by the degrees of freedom of the feature space.

6. The method of claim 4, further comprising:
   downsampling the source image prior to optimizing the BBWs in the feature space; and
   upsampling the optimized BBWs using interpolation.

7. The method of claim 1, wherein iteratively optimizing the warp function using the content-aware weights includes performing an inverse compositional Lucas-Kanade procedure.

8. The method of claim 7, wherein the iterative optimization further includes optimizing per-weight bias and gain parameters.

9. A non-transitory computer-readable storage medium storing instructions, which when executed by a computer system, perform operations for transferring image edits from a source image to a target image, the operations comprising:
   determining, via one or more processors, content-aware weights for the source image, wherein the content-aware weights are content-aware bounded biharmonic weights (BBWs);
   determining, via the one or more processors, an initial warp from the source image to the target image;

iteratively optimizing the initial warp using the content-aware weights; and applying the optimized warp to transfer the image edits to the target image.

10. The computer-readable storage medium of claim 9, the operations further comprising, receiving a selection of a region of interest in the source image.

11. The computer-readable storage medium of claim 9, the operations further comprising, determining gradient magnitude values for the source image;

determining a confidence image by applying heat diffusion to the gradient magnitude values; and iteratively selecting a plurality of highest confidence locations, wherein the iteratively selecting includes subtracting a Gaussian kernel from the confidence image after each selection of a highest confidence location, and wherein the selected plurality of highest confidence locations provide seed locations for the content-aware weights.

12. The computer-readable storage medium of claim 9, wherein determining the content-aware weights includes optimizing BBWs in a feature space.

13. The computer-readable storage medium of claim 12, wherein initializing the warp from the source image to the target image includes:

determining a piecewise affine map between scale-invariant transform (SIFT) features of the target image and SIFT features of the source image, and projecting the piecewise affine map to a space of maps spanned by the degrees of freedom of the feature space.

14. The computer-readable storage medium of claim 12, the operations further comprising:

downsampling the source image before optimizing the BBWs in the feature space; and upsampling the optimized BBWs using interpolation.

15. The computer-readable storage medium of claim 9, wherein iteratively optimizing the warp function using the content-aware weights includes performing the inverse compositional Lucas-Kanade procedure.

16. The computer-readable storage medium of claim 15, wherein the iterative optimization further includes optimizing per-weight bias and gain parameters.

17. A system, comprising:

a processor; and a memory, wherein the memory includes an application program configured to perform operations for transferring image edits from a source image to a target image, the operations comprising:

determining content-aware weights for the source image, wherein the content-aware weights are content-aware bounded biharmonic weights (BBWs), determining an initial warp from the source image to the target image, iteratively optimizing the initial warp using the content-aware weights, and applying the optimized warp to transfer the image edits to the target image.

18. The system of claim 17, wherein determining the content-aware weights includes optimizing BBWs in a feature space, and wherein iteratively optimizing the warp function using the content-aware weights includes performing an inverse compositional Lucas-Kanade procedure.

* * * * *